United States Patent
Siebens et al.

(10) Patent No.: US 9,337,553 B2
(45) Date of Patent: May 10, 2016

(54) GROUNDING ROD FOR SACRIFICIAL APPENDAGE

(71) Applicant: Thomas & Betts International LLC, Wilmington (DE)

(72) Inventors: Larry N. Siebens, Asbury, NJ (US); Carlos H. Hernandez, Germantown, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 56 days.

(21) Appl. No.: 14/511,452

(22) Filed: Oct. 10, 2014

(65) Prior Publication Data

US 2015/0118892 A1    Apr. 30, 2015

Related U.S. Application Data

(60) Provisional application No. 61/897,542, filed on Oct. 30, 2013.

(51) Int. Cl.
| | |
|---|---|
| *H01R 27/00* | (2006.01) |
| *H01R 4/28* | (2006.01) |
| *H01R 13/42* | (2006.01) |
| *H01R 4/18* | (2006.01) |
| *H01R 4/64* | (2006.01) |
| *H01R 13/53* | (2006.01) |
| *H01R 43/00* | (2006.01) |
| *H02G 15/064* | (2006.01) |

(52) U.S. Cl.
CPC .. *H01R 4/28* (2013.01); *H01R 4/18* (2013.01); *H01R 4/64* (2013.01); *H01R 13/42* (2013.01); *H01R 13/53* (2013.01); *H01R 43/002* (2013.01); *H02G 15/064* (2013.01)

(58) Field of Classification Search
CPC ........ H01R 4/28; H01R 13/53; H01R 43/002; H01R 13/42; H01R 4/18; H01R 4/64; H02G 15/064

See application file for complete search history.

(56) References Cited

U.S. PATENT DOCUMENTS

| | | |
|---|---|---|
| 1,902,617 A | 3/1933 | Burr |
| 2,937,359 A | 5/1960 | Cronin et al. |
| 2,941,834 A | 6/1960 | Appleton et al. |
| 3,343,153 A | 9/1967 | Waehner |
| 3,363,171 A | 1/1968 | Sietmann et al. |
| 3,390,331 A | 6/1968 | Brown et al. |
| 3,740,700 A | 6/1973 | Robertson |
| 3,835,439 A | 9/1974 | Yonkers |

(Continued)

FOREIGN PATENT DOCUMENTS

| | | |
|---|---|---|
| CA | 2571779 | 2/2010 |
| CA | 2541647 | 3/2014 |

OTHER PUBLICATIONS

Extended European Search Report for corresponding Application No. 14190650.3-1801 dated Mar. 17, 2015.

*Primary Examiner* — Jean F Duverne
(74) *Attorney, Agent, or Firm* — Hoffman & Baron, LLP

(57) ABSTRACT

A grounding rod for a sacrificial appendage of an electrical cable connector, such as a splicing connector for joining two or more electrical cables, is provided. The sacrificial appendage is comprised of a feature for enabling personnel to ensure that the connector is de-energized, and once this is confirmed, the sacrificial appendage may be removed and replaced with a ground rod to which a grounding device can be connected to ground the system.

20 Claims, 9 Drawing Sheets

(56) References Cited

U.S. PATENT DOCUMENTS

| | | | |
|---|---|---|---|
| 3,853,375 A | 12/1974 | McClain | |
| 3,883,208 A | 5/1975 | Sankey et al. | |
| 3,915,534 A | 10/1975 | Yonkers | |
| 3,924,919 A | 12/1975 | McClain | |
| 3,959,869 A | 6/1976 | Wyman et al. | |
| 3,980,374 A | 9/1976 | Fallot | |
| 4,152,643 A | 5/1979 | Schweitzer, Jr. | |
| 4,202,591 A | 5/1980 | Borgstrom | |
| 4,272,798 A | 6/1981 | Merola | |
| 4,660,909 A | 4/1987 | Wilson | |
| 4,744,765 A | 5/1988 | DeLeo | |
| 4,760,327 A | 7/1988 | Walsh et al. | |
| 4,787,855 A | 11/1988 | Finke | |
| 4,794,331 A | 12/1988 | Schweitzer, Jr. | |
| 4,799,895 A | 1/1989 | Borgstrom | |
| 4,822,289 A | 4/1989 | DeLeo | |
| 4,859,192 A | 8/1989 | DeLeo | |
| 4,865,559 A | 9/1989 | Clabburn | |
| 4,904,932 A | 2/1990 | Schweitzer, Jr. | |
| 4,946,393 A | 8/1990 | Borgstrom et al. | |
| 5,082,449 A * | 1/1992 | Borgstrom | H01R 13/53 439/190 |
| 5,114,357 A | 5/1992 | Luzzi | |
| 5,131,855 A | 7/1992 | Pickering | |
| 5,367,251 A | 11/1994 | McTigue | |
| 5,450,280 A | 9/1995 | Wactor | |
| 6,075,209 A | 6/2000 | Luzzi | |
| 6,210,206 B1 | 4/2001 | Durham | |
| 6,332,785 B1 | 12/2001 | Muench, Jr. et al. | |
| 6,843,685 B1 | 1/2005 | Borgstrom et al. | |
| 7,150,098 B2 | 12/2006 | Borgstrom et al. | |
| 7,154,281 B2 | 12/2006 | Piesinger | |
| 7,173,187 B2 | 2/2007 | Triantopoulos et al. | |
| 7,288,718 B2 | 10/2007 | Stepniak et al. | |
| 7,470,131 B2 | 12/2008 | Hughes | |
| 7,572,133 B2 * | 8/2009 | Hughes | H01H 33/66207 439/181 |
| 7,708,576 B2 | 5/2010 | Hughes et al. | |
| 7,883,356 B2 | 2/2011 | Hughes et al. | |
| 7,901,227 B2 | 3/2011 | Hughes | |
| 7,901,243 B1 | 3/2011 | Yaworski | |
| 7,909,635 B2 | 3/2011 | Hughes et al. | |
| RE42,331 E | 5/2011 | Carpenter, Jr. et al. | |
| 7,942,679 B1 | 5/2011 | Gretz | |
| 7,946,870 B2 | 5/2011 | Hughes et al. | |
| 7,958,631 B2 * | 6/2011 | Hughes | H02G 1/14 29/426.4 |
| 8,056,226 B2 * | 11/2011 | Hughes | H01R 43/24 264/272.12 |
| 8,128,423 B2 | 3/2012 | Borgstrom et al. | |
| 8,147,273 B2 | 4/2012 | Rabbe et al. | |
| 8,172,596 B2 | 5/2012 | Siebens | |
| 8,368,405 B2 * | 2/2013 | Siebens | G01R 1/0416 324/538 |
| 8,388,381 B2 | 3/2013 | Borgstrom et al. | |
| 8,454,376 B1 | 6/2013 | Siebens | |
| 8,597,040 B2 | 12/2013 | Siebens et al. | |
| 8,616,908 B2 | 12/2013 | Siebens | |
| 2009/0108847 A1 | 4/2009 | Hughes et al. | |
| 2011/0217876 A1 | 9/2011 | Siebens | |
| 2014/0024241 A1 | 1/2014 | Siebens | |
| 2014/0065867 A1 | 3/2014 | Siebens | |

\* cited by examiner

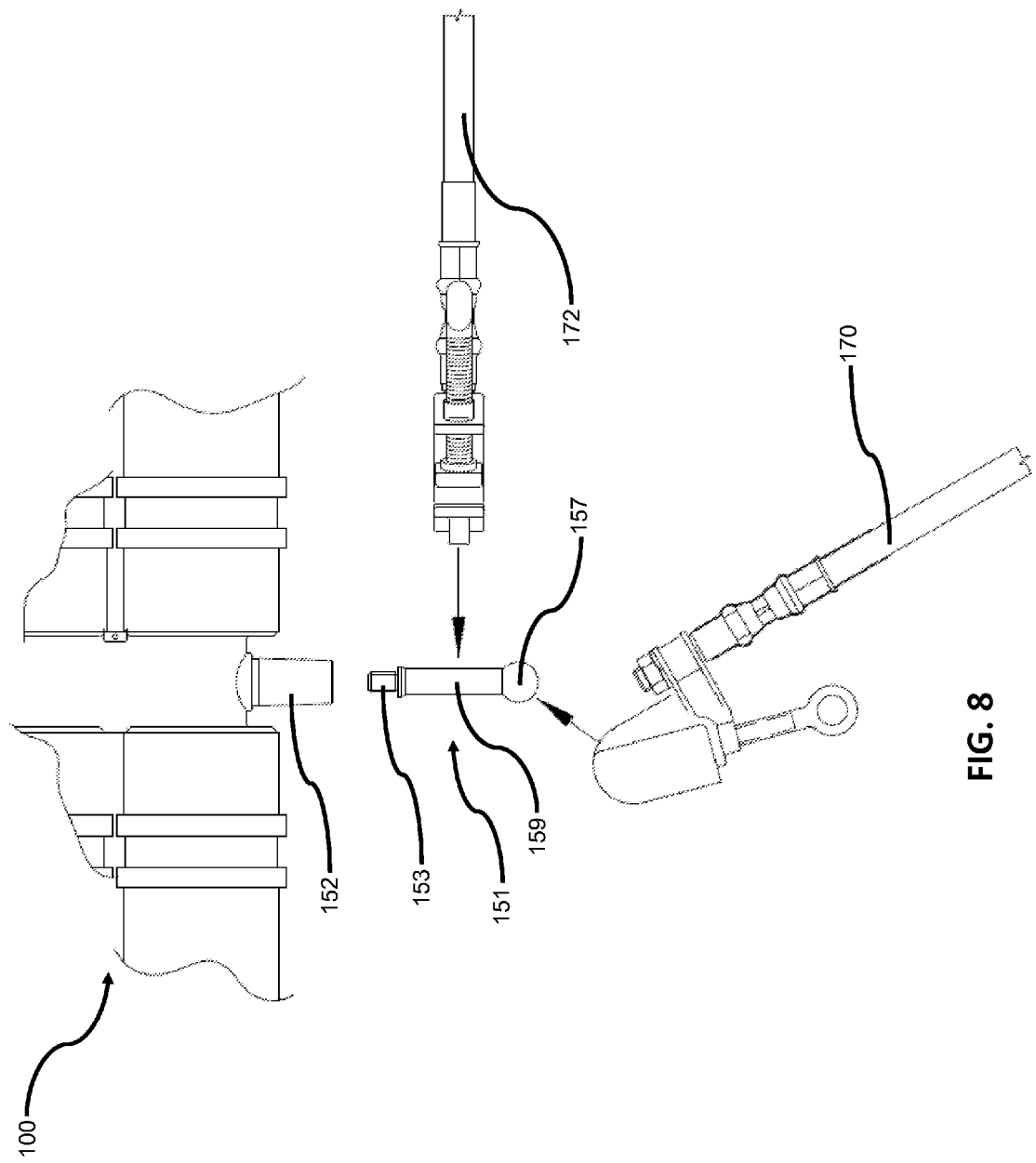

9,337,553 B2

GROUNDING ROD FOR SACRIFICIAL APPENDAGE

CROSS-REFERENCE TO RELATED APPLICATION

This application claims priority under 35 U.S.C. §119, based on U.S. Provisional Patent Application No. 61/897,542, filed on Oct. 30, 2013, the disclosure of which is hereby incorporated by reference herein.

FIELD OF THE INVENTION

In general, the present invention relates to a grounding rod for a sacrificial appendage of an electrical cable connector, such as a splicing connector for joining two or more electrical cables. More particularly, aspects described herein relate to an electrical cable connector that includes a feature for enabling personnel to ensure that the connector is de-energized and which can be removed and replaced with a ground rod to which a grounding device can be connected to ground the system.

BACKGROUND

Medium and high voltage electrical connectors and components typically operate in the 15 to 35 kilovolt (kV) range. Because such voltages are potentially very dangerous, it is typically necessary for personnel to confirm that power is disconnected before commencing work or repair. Know methods of visual or physical de-energizing confirmation include "spiking the cable," in which a grounded spike is driven through the cable and into the conductor or a grounded hydraulic cable cutter is used to physically cut the cable in half. Unfortunately, after a cable is "spiked," the utility is required to replace the cable or increase its length by adding a splice and additional cable in order to reconnect to the system. This is costly and time consuming. Additionally, once it is confirmed that the system has been de-energized, it must be connected to system ground in order to be safely serviced. In currently used splicing connectors, one leg of the spliced connection must first be disconnected, and then a grounding device, such as a ground clamp, can be attached in order to connect the splice to system ground. Because this requires partially disassembling the splice, it is a time consuming practice.

SUMMARY OF THE INVENTION

The present invention provides a grounding rod for a sacrificial appendage of medium and high voltage electrical cable connectors, such as "T", "Y" and "H" splicing connectors. The sacrificial appendage is cut to confirm that the system has been de-energized, and then a cap of the appendage is removed and replaced with a grounding rod to which a grounding device is attached so that the splicing connector and any attached cables can be connected to system ground.

BRIEF DESCRIPTION OF THE DRAWINGS

FIG. 8 is a side elevation view of a ground rod being installed on a sacrificial appendage connection portion and connected to system ground of the present invention.

DETAILED DESCRIPTION OF THE PREFERRED EMBODIMENT(S)

Figure 1:
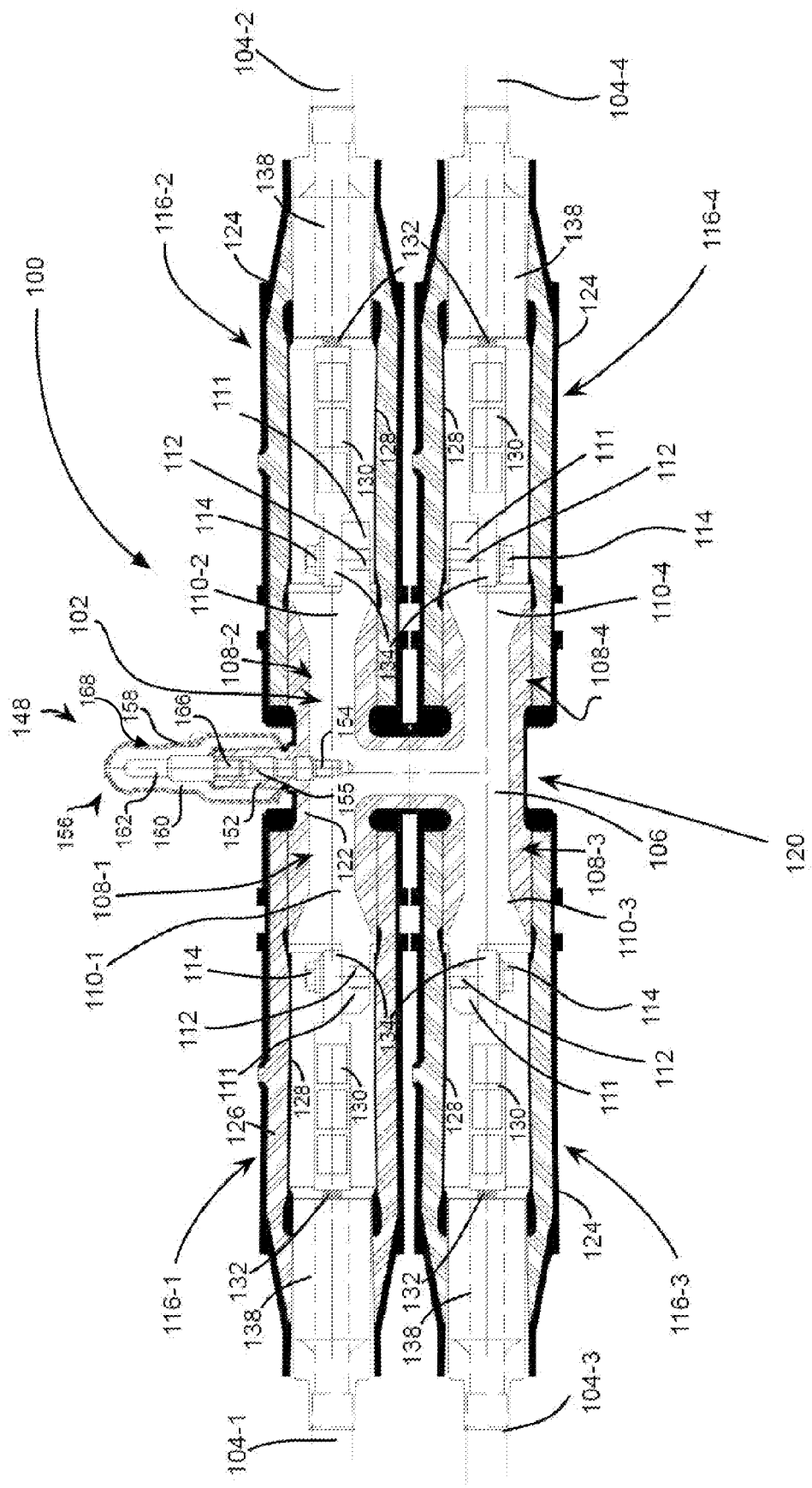
FIG. 1 is a cross-sectional side elevation view of a completely assembled splicing cable connector with a sacrificial appendage of the present invention.

The above and other features, aspects and advantages of the present invention will now be discussed in the following detailed description of preferred embodiments and appended claims, which are to be considered in conjunction with the accompanying drawings in which identical reference characters designate like elements throughout the views.

Shown in FIG. 1 is a cross-sectional diagram illustrating a power cable splicing connector 100 configured in a manner consistent with the implementations described herein. As shown in FIG. 1, power cable splicing connector 100 may include a four-way yoke 102 for enabling connection of power cables 104-1, 104-2, 104-3 and 104-4 (collectively "power cables 104," and individually "power cable 104-x"). For example, power cable 104-1 may be a supply cable and cables 104-2 to 104-4 may be load cables. Other types of power cable splicing connectors may be configured in accordance with implementations described herein, such as three-way yoke connectors, two-way yoke connectors, etc.

In one implementation, yoke 102 of power cable splicing connector 100 may include a central conductor 106 and a number of splice openings 108-1 to 108-4 (collectively "splice openings 108," and individually "splice opening 108-x"). Central conductor 106 may be formed of a suitably conductive material, such as copper, aluminum or other conductive alloy. Further, as shown in FIG. 1, central conductor 106 may include outwardly extending portions 110-1 to 110-4 (collectively "outwardly extending portions 110," and individually "outwardly extending portion 110-x") that project from respective splice openings 108-x. As described in additional detail below, central conductor 106 may connect each of power cables 104-x to each other power cable 104-x, such that voltage applied to one cable is transferred to each other cable.

Outwardly extending portions 110 may be configured to receive connector portions of power cables 104. For example, each extending portion 110-x may include a spade portion 111 having a threaded bore 112 therein for receiving a connector bolt 114. In one configuration, as illustrated in FIG. 1, outwardly extending portion 110-1 extends oppositely from outwardly extending portion 110-2 and outwardly extending portion 110-3 extends oppositely from outwardly extending portion 110-4. Furthermore, outwardly extending portions 110-1 and 110-2 may be oriented parallel to outwardly extending portions 110-3 and 110-4, respectively. Such a configuration may provide for compact splicing or splitting of a power supply cable (e.g., cable 104-1) to multiple load cables (e.g., cables 104-2 to 104-4).

As shown in FIG. 1, each splice opening 108-$x$ includes a cable receptacle interface that includes a substantially cylindrical flange or cuff portion configured to frictionally engage a cable receptacle 116-$x$ (individually, cable receptacle 116-$x$, or collectively, cable receptacles 116). For example, an inside diameter of a forward end of cable receptacle 116-$x$ may be sized to frictionally engage the cuff portion of splice opening 108-$x$. Each cable receptacle 116-$x$ may be substantially cylindrical and may be configured to surround and protect an interface between power cables 104 and extending portions 110.

Yoke 102 may include an outer shield 120 formed from, for example, a peroxide-cured synthetic rubber, commonly referred to as EPDM (ethylene-propylene-diene monomer). Within shield 120, yoke 102 may included an insulative inner housing 122, typically molded from an insulative rubber or epoxy material. Central conductor 106 may be enclosed within insulative inner housing 122.

Regarding cable receptacles 116, each cable receptacle 116-$x$ may include an EPDM outer shield 124 and an insulative inner housing 126, typically molded from an insulative rubber or epoxy material. Cable receptacle 116-$x$ further includes a conductive or semi-conductive insert 128 having a bore there through. Upon assembly, cable receptacle 116-$x$ surrounds the interface between power cable 104-$x$ and outwardly extending portion 110-$x$. In one implementation, a forward end of insert 128 may be configured to frictionally engage outwardly extending portion 110-$x$ of central conductor 106 upon assembly of splicing connector 100, thereby ensuring the electrical integrity of splicing connector 100.

Referring to power cables 104, a forward end of each power cable 104-$x$ may be prepared by connecting power cable 104-$x$ to a crimp connector 130. Crimp connector 130 may include a substantially cylindrical assembly configured to receive a cable conductor 132 of power cable 104-$x$ therein. During preparing of power cable 104-$x$, a portion of crimp connector 130 may be physically deformed (e.g., crimped) to fasten crimp connector 130 to cable conductor 132. Crimp connector portion 130 may include a forward spade portion 134 configured to be securely fastened to the spade portion 111 of outwardly extending portion 110-$x$ of central conductor 106. For example, forward spade portion 134 may include a bore (not shown) configured to align with bore 112 in spade portion 111. Connector bolt 114 may be inserted through the bore and into threaded bore 112 during assembly of splice connector 100.

As shown in FIG. 1, each of the prepared power cables 104 may further include an adapter 138 disposed rearwardly relative to crimp connector 130. Adapter 138 may be affixed to power cable 104-$x$ and may provide a frictional engagement with a rearward portion of cable receptacle 116-$x$. In one implementation, adapter 138 may be formed of an insulative material, such as rubber or epoxy.

Consistent with implementations described herein, yoke 102 may include a sacrificial appendage 148 projecting therefrom. In one implementation, sacrificial appendage 148 may project substantially perpendicularly from outwardly extending portions 110, so as to be relatively free of encumbrances.

When it is necessary for work to be performed on any of power cables 104 (or devices connected to power cables 104), a worker may cut through sacrificial appendage 148 (e.g., with a hydraulic cable cutter, or similar tool) to ensure that the electrical system that the splicing connector 100 is connected to has been properly de-energized and is, therefore, safe to work on. Once the sacrificial appendage 148 has been cut, and a portion (to be described in detail below) has been removed, a sacrificial appendage connection portion 152 is then exposed projecting outwardly from yoke 102 (see FIG. 5). In one implementation, sacrificial appendage connection portion 152 may be integrally formed with inner housing 122 and may include a contact 154 provided therein. Contact 154 may extend into a corresponding portion of central conductor 106, such as via a threaded bore provided in central conductor 106. Contact 154 may include a female thread 155 at an outer end thereof for receiving a sacrificial cap 156 and for receiving a ground rod 151 for grounding the system, to be described below.

As shown in FIG. 1, sacrificial cap 156 may include an EPDM outer shield 158 and an insulative inner housing 160, typically molded from an insulative rubber or epoxy material. Sacrificial cap 156 may further include a sacrificial conductor 162 received within a rearward portion of inner housing 160. Furthermore, a forward portion of sacrificial cap 156 may include a cavity 164 therein, shown in FIG. 2, for engaging a projecting portion of sacrificial appendage connection portion 152.

A forward portion of outer shield 158 and inner housing 160 may be configured to surround and protect an interface between sacrificial appendage connection portion 152 and sacrificial conductor 162. In one implementation, a forward end of outer shield 158 and inner housing 160 may be configured to frictionally engage a stepped or notched outer configuration of sacrificial appendage connection portion 152 upon assembly of splicing connector 100, thereby ensuring the electrical integrity of splicing connector 100.

Consistent with implementations described herein, sacrificial conductor 162 may include a conductive threaded male protrusion 166 extending axially there-from. As described above, the projecting portion of contact 154 of sacrificial appendage connection portion 152 may include threaded female cavity 155. Male protrusion 166 may correspond to threaded female portion 155 in contact 154 to couple contact 154 to sacrificial conductor 162, thereby conductively connecting sacrificial conductor 162 to central conductor 106 of yoke 102. In other implementations, the male/female relationship may be reversed.

Figure 3:
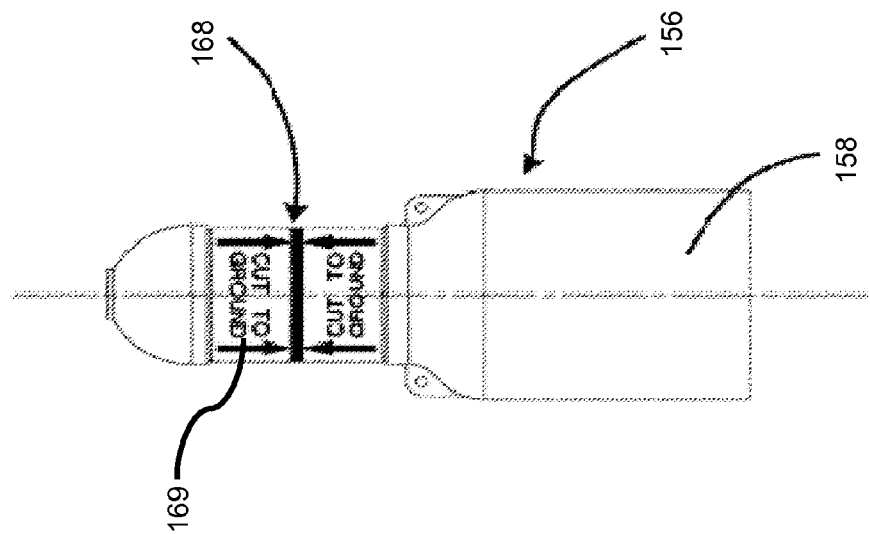
FIG. 3 is a side elevation view of a sacrificial cap of the present invention.
Figure 2:
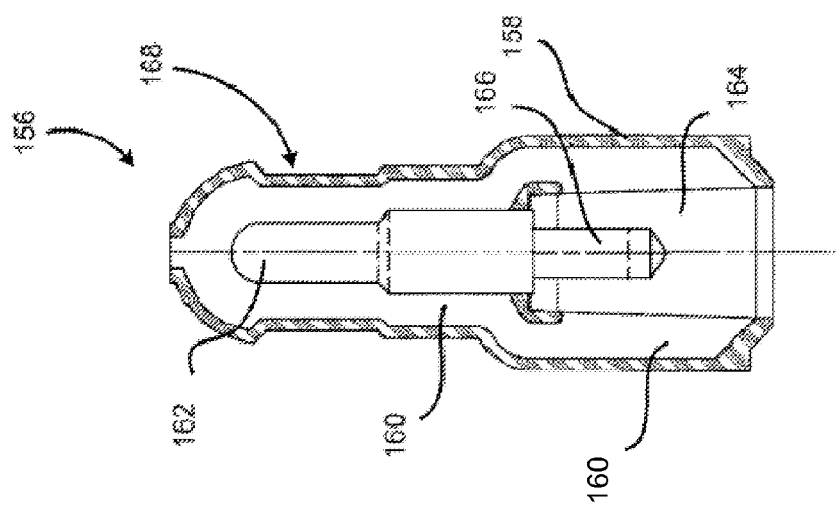
FIG. 2 is a cross-sectional side elevation view of a sacrificial cap of the present invention.

In one implementation, a cut-through region 168 may be provided in an outer portion of sacrificial cap 156 in a region overlying at least a portion of sacrificial conductor 162, as shown in FIG. 2. In some implementations, indicia 169 relating to cut-through region 168 may be provided on a surface of outer shield 158, shown in FIG. 3, for indicating that a user is to cut through sacrificial cap 156 at cut-through region 168.

Figure 11:
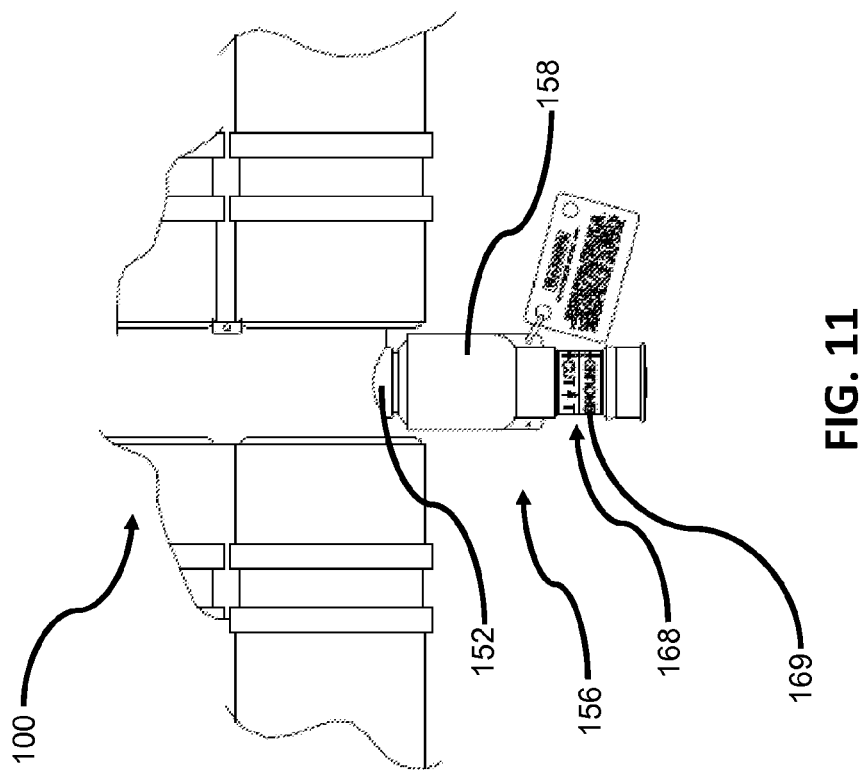
FIG. 11 is a side elevation view of a new, intact sacrificial appendage which has been installed on a sacrificial appendage connection portion of the present invention.
Figure 10:
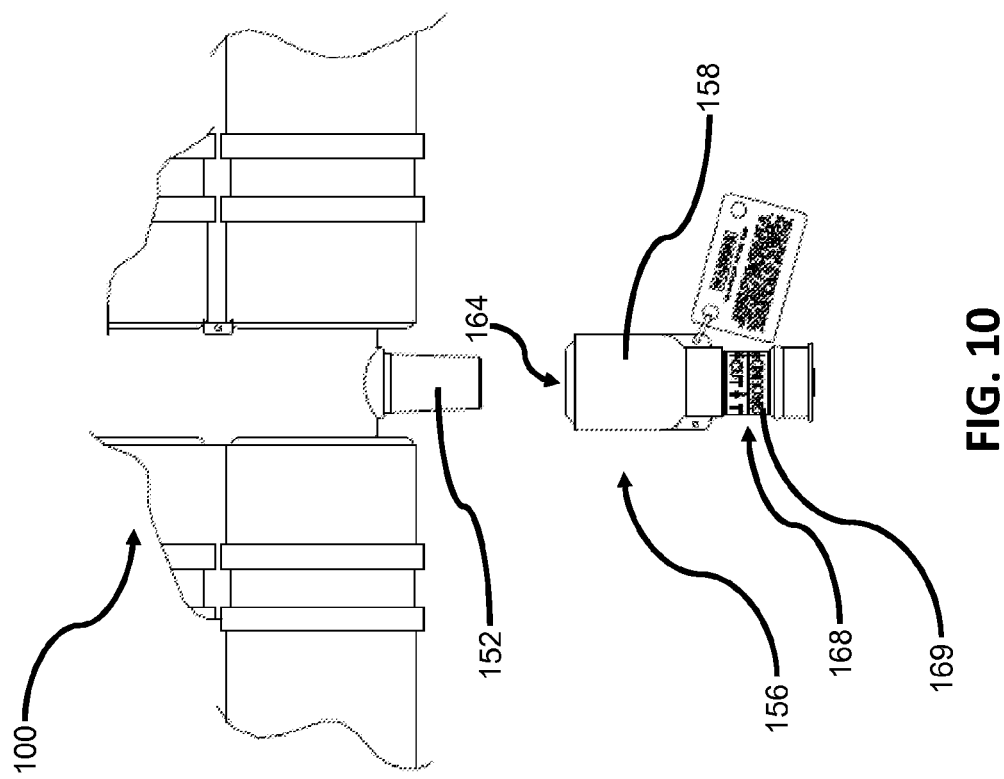
FIG. 10 is a side elevation view of a new, intact sacrificial appendage being installed on a sacrificial appendage connection portion of the present invention.

When it is necessary for work to be performed on any of power cables 104 (or devices connected to power cables 104), a worker may cut through sacrificial cap 156 at cut-through region 168 (e.g., with a grounded hydraulic cable cutter, or similar tool) to ensure that the electrical system that splicing connector 100 is connected to has been properly de-energized, and is, therefore, safe to work on. When it is time to re-energize splicing connector 100, the cut-through sacrificial cap 156 may be discarded and a new or replacement sacrificial cap 156 may be installed, as shown in FIGS. 10 and 11.

Figure 4:
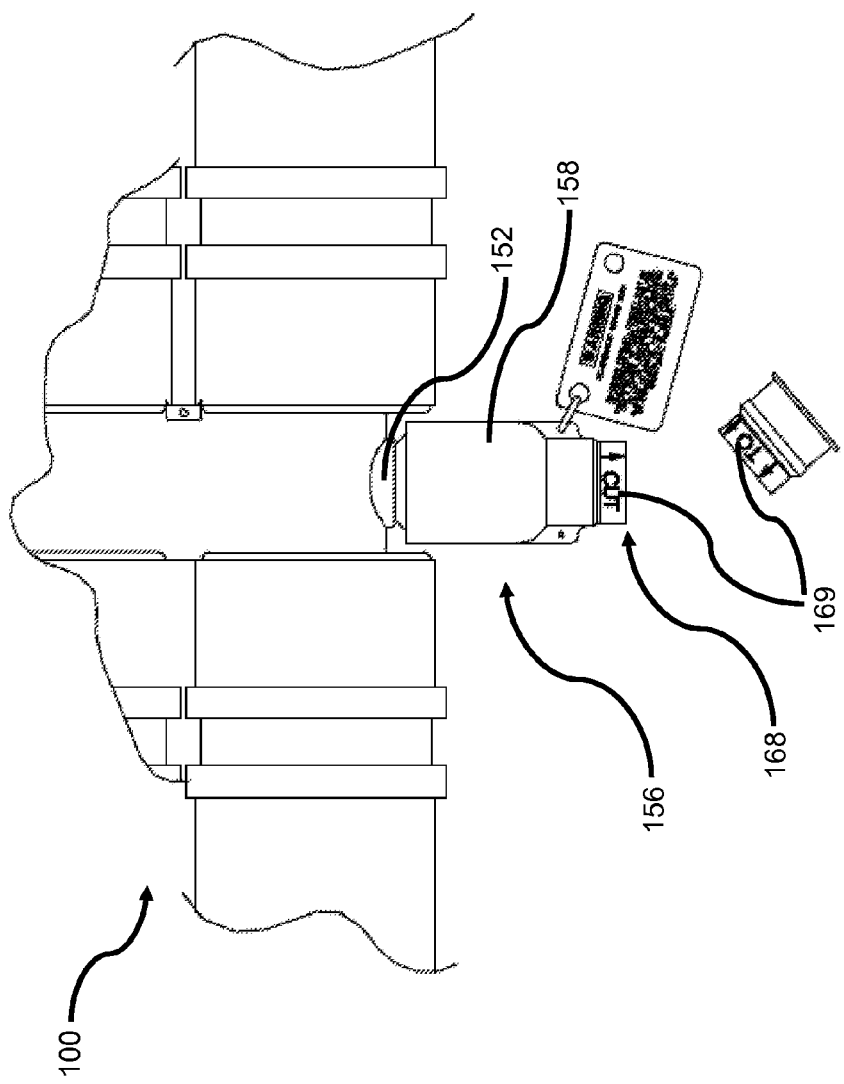
FIG. 4 is a side elevation view of a splicing cable connector with a cut-through sacrificial appendage of the present invention.
Figure 5:
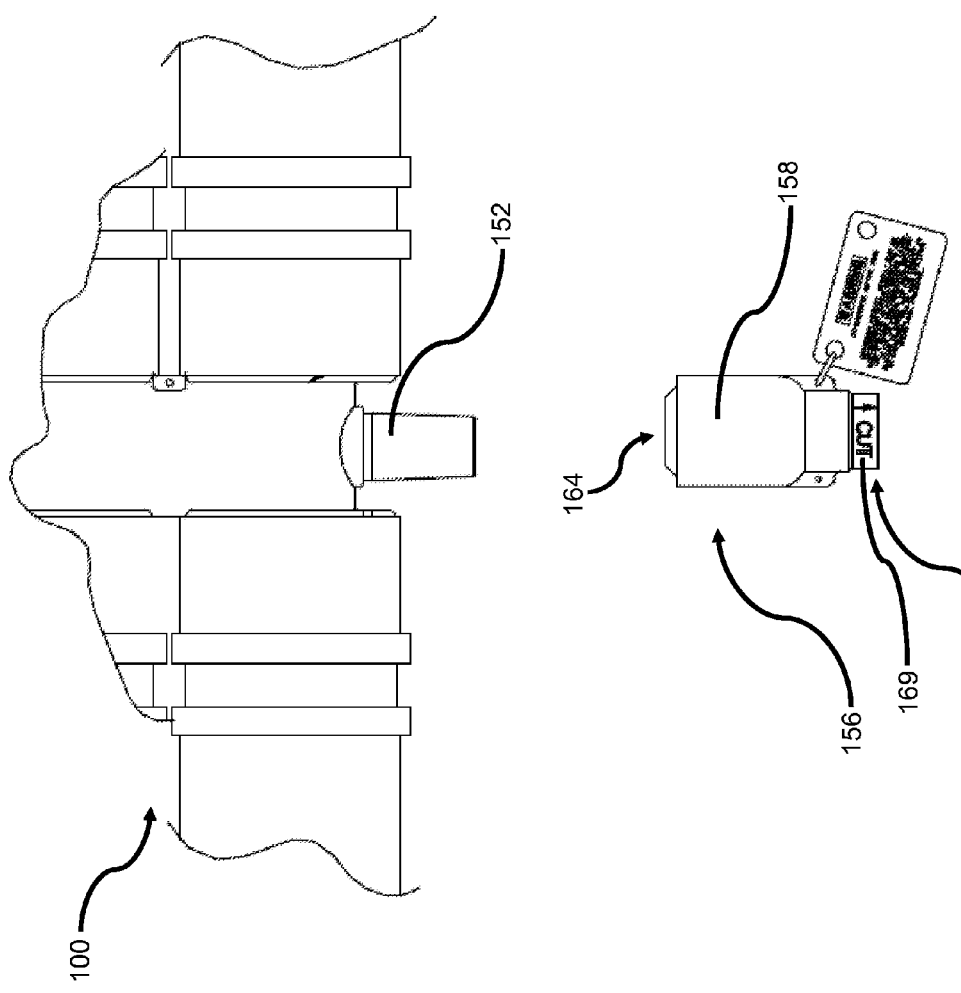
FIG. 5 is a side elevation view of a splicing cable connector with a removed cut-through sacrificial appendage of the present invention.
Figure 7:
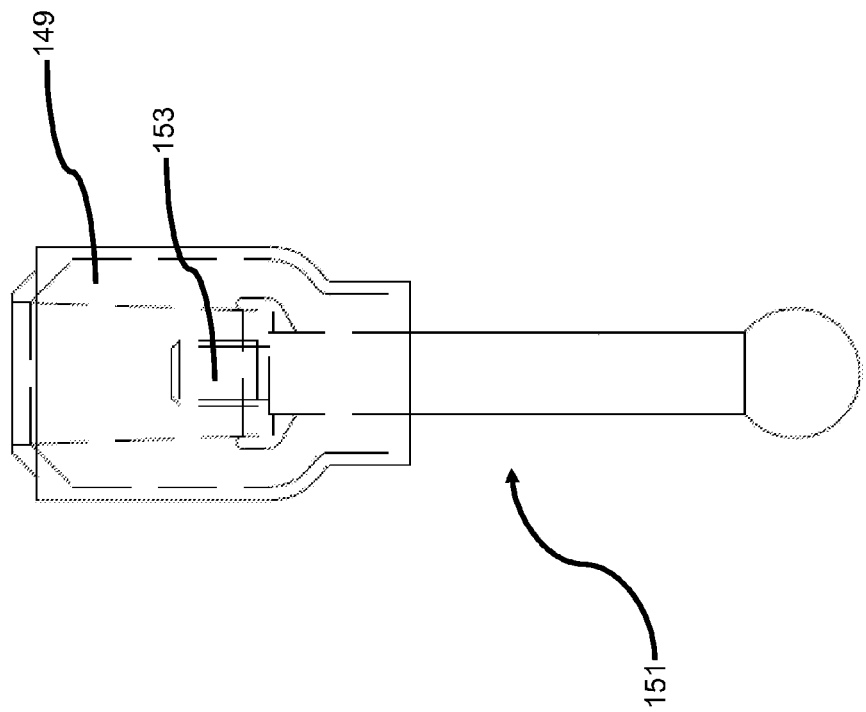
FIG. 7 is a side elevation view of a ground rod with a molded cap of the present invention.
Figure 6:
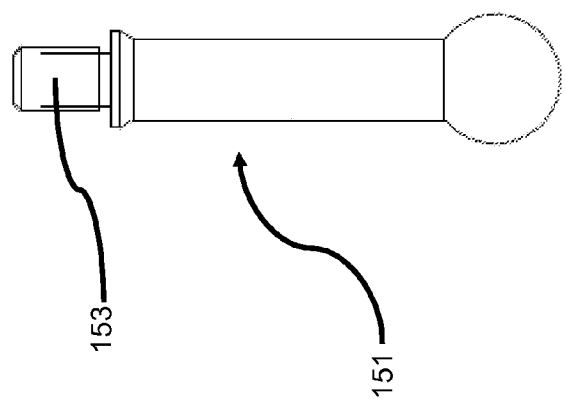
FIG. 6 is a side elevation view of a ground rod of the present invention.

After the sacrificial cap 156 has been cut at the cut-through region 168, shown in FIG. 4, to ensure that the system has been properly de-energized, a worker must then connect the system to system ground in order for the splicing connector 100 to be safely serviced. Rather than disassembling a leg of the splicing connector 100, as is the current method to connect the system to system ground, the sacrificial appendage connection portion 152 and its corresponding threaded female cavity 155 can accept a ground rod 151 (once the cut-through sacrificial cap 156 has been removed, as shown in FIG. 5) as a convenient way of grounding the system without having to disassemble the splicing connector 100 and having to connect a grounding device to one of the legs of the splicing connector. The ground rod 151, as shown in FIGS. 6 and 7, may or may not have an EPDM molded cap 149 on its end which connects to sacrificial appendage connection portion 152. If a ground rod 151 is used which has the molded cap 149, then the cap 149 covers the interface between the ground rod 151 and the sacrificial appendage connection portion 152. Regardless of whether the ground rod 151 has the molded cap 149 or not, the ground rod 151 is comprised of a threaded male protrusion 153 on its end which connects to sacrificial appendage connection portion 152, which thereby corresponds to the threaded female cavity 155 as described above. Because the threaded female cavity 155 is part of the contact 154 which extends into a corresponding portion of central conductor 106, as shown in FIG. 1, this allows for the ground rod 151 to be mechanically and conductively coupled to the splicing connector 100 when the ground rod is attached to the connection portion 152. Once the ground rod 151 is securely attached to the sacrificial appendage connection portion 152, a worker may connect a grounding device, such as a grounding clamp, to ground rod 151 to ensure that the splicing connector 100 is properly connected to system ground so that it may be safely serviced.

Figure 9:
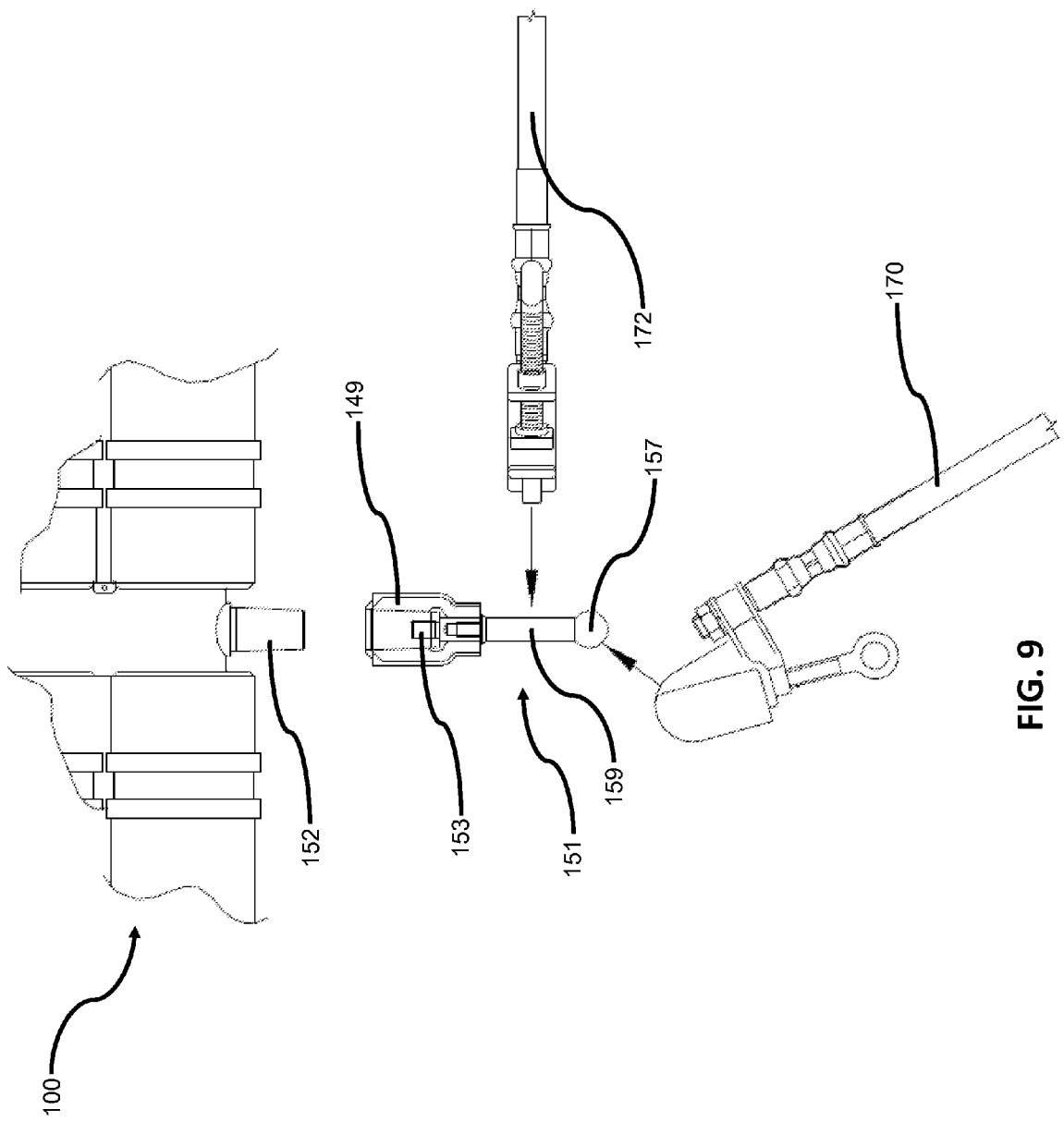
FIG. 9 is a side elevation view of a ground rod with a molded cap being installed on a sacrificial appendage connection portion and connected to system ground of the present invention.

Shown in FIGS. 8 and 9 are two types of grounding devices which can be attached to ground rod 151 in order to connect splicing connector 100 and any attached cables to system ground. FIG. 8 shows the ground rod 151 without the molded cap 149 and FIG. 9 shows the ground rod with the molded cap 149, as previously described. Both figures show a bar type grounding clamp 172 and a ball type grounding clamp 170. The ball type grounding clamp 170 attaches to a ball end 157 of ground rod 151. The bar type grounding clamp 172 attaches to a middle portion 159 of ground rod 151. Either type of grounding clamp 170 or 172 may be used to achieve the purpose of connecting the splicing connector 100 to system ground. It is assumed that before the ground rod 151 was installed in the sacrificial appendage connection portion 152, the entire system was de-energized, which was confirmed by cutting through the sacrificial appendage cut-through region 168, as shown in FIG. 4 and described above, so that a worker could safely service the splicing connector 100. In both implementations shown in FIGS. 8 and 9, the grounding clamp 170 or 172 is connected to system ground in order to ground splicing connector 100 and any attached cables once the ground clamp 170 or 172 is attached to ground rod 151. Though ground clamps 170 and 172 are the only two grounding devices shown, it is understood that other types of grounding devices may be available to attach to ground rod 151 in order to achieve the purpose of connecting splicing connector 100 to system ground.

After a worker is finished servicing the grounded splicing connector 100 and any attached cables, they may then remove the ground clamp 170 or 172 from the ground rod 151. The ground rod 151 may then be removed from the sacrificial appendage connection portion 152 by unscrewing the threaded male protrusion 153 from the threaded female cavity 155, and a new and intact sacrificial cap 156 may be installed on sacrificial appendage connection portion 152, connecting to sacrificial appendage connection portion 152 as described above. The placement of a new, intact sacrificial cap 156 is shown in FIGS. 10 and 11. Once the new, intact sacrificial cap 156 is securely installed, the system may be safely energized once again. The above described invention allows for a quick and convenient manner of detecting whether or not a system has been de-energized and a way to safely and conveniently ground that same system.

Figure 12:
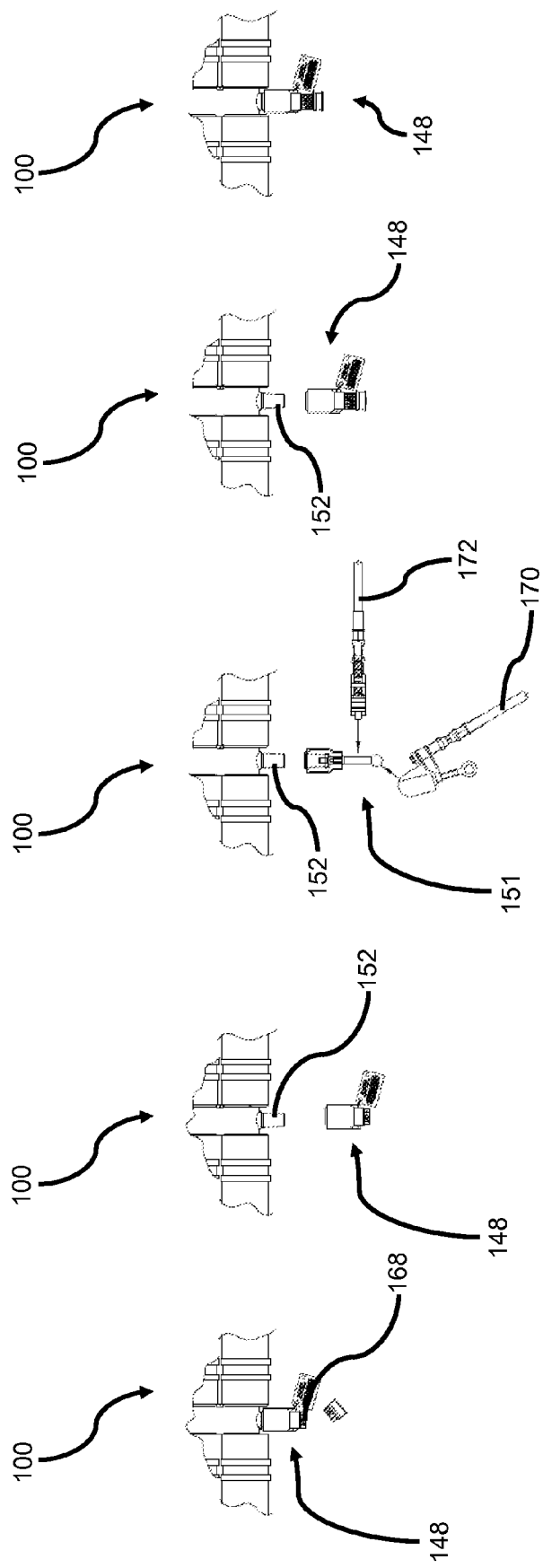
FIG. 12 is a flowchart showing a sequence of events to properly use a sacrificial appendage of the present invention.

Lastly, shown in FIG. 12 is a flowchart showing a sequence of events to properly use the sacrificial appendage 148 and ground rod 151 of the splicing connector 100 described above. The flowchart illustrates the following steps: providing the splicing connector 100 which is comprised of a sacrificial appendage connection portion 152 for a sacrificial appendage 148 that is conductively connected to the splicing connector 100, confirming that the splicing connector 100 and any equipment conductively coupled to the connector 100 is de-energized by cutting through the cut-through region 168 of the sacrificial appendage 148, removing the cut-through sacrificial appendage 148, replacing the cut-through sacrificial appendage 148 with a ground rod 151 which is releasably retained within the sacrificial appendage connection portion 152, connecting a grounding clamp 170 or 172 which is connected to system ground to the ground rod 151, performing service on the splicing connector 100 or on equipment conductively coupled to the splicing connector 100, disconnecting the grounding clamp 170 or 172 from the ground rod 151, removing the ground rod 151 from the sacrificial appendage connection portion 152, replacing the ground rod 151 with a new, intact sacrificial appendage 148 and re-energizing the splicing connector 100 and any equipment conductively coupled to the connector 100.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

What is claimed is:
1. An electrical connector, comprising:
a yoke, which is comprised of an outer housing, a sacrificial appendage configured to be cut through in order to confirm that the electrical connector is de-energized and a central conductor provided within the outer housing;
wherein the cut-through sacrificial appendage can be removed and replaced by a ground rod which is releasably retained within the yoke and allows for the electrical connector to be grounded when connected to system ground by the ground rod; and
wherein the ground rod can be removed and replaced with a new, intact sacrificial appendage which is releasably retained within the yoke and which is mechanically and conductively connected to the central conductor of the electrical connector.
2. The electrical connector of claim 1, wherein the yoke comprises a two-way yoke, a three-way yoke, or a four-way yoke.
3. The electrical connector of claim 1, wherein the ground rod further comprises a rounded ball end on an outwardly extending portion of the ground rod which extends from the outer housing of the yoke for attachment to a ball type grounding clamp.

4. The electrical connector of claim 1, wherein the ground rod further comprises a middle elongate portion of the ground rod for attachment to a bar type grounding clamp.

5. The electrical connector of claim 1, wherein the central conductor comprises at least three outwardly extending portions which are comprised of a first outwardly extending portion and a second outwardly extending portion of the central conductor which are operatively coupled to first and second power cables, respectively, and a third outwardly extending portion of the central conductor which is comprised of the sacrificial appendage.

6. The electrical connector of claim 5, wherein the sacrificial appendage comprises a sacrificial cap, and wherein the yoke is configured to releasably retain the sacrificial cap in conductive contact with the third outwardly extending portion.

7. The electrical connector of claim 6, wherein the third outwardly extending portion further comprises a sacrificial interface conductively coupled to the third outwardly extending portion, and wherein the sacrificial interface is configured to releasably receive the sacrificial cap thereon.

8. The electrical connector of claim 7, wherein the sacrificial cap further comprises an insulative inner housing and a sacrificial conductor extending axially within the housing, and wherein the housing includes a cut-through region overlying the sacrificial conductor, and wherein the sacrificial conductor, and the sacrificial cap within which it is housed, is configured for releasable attachment to the sacrificial interface.

9. The electrical connector of claim 5, further comprising a first cable receptacle for providing an interface between the first outwardly extending portion and the first power cable, and a second cable receptacle for providing an interface between the second outwardly extending portion and the second power cable, wherein the first and second cable receptacles are configured for engagement with the outer housing of the yoke.

10. The electrical connector of claim 5, wherein each of the first outwardly extending portion and the second outwardly extending portion further comprise a spade portion for connecting to the first and second power cables, respectively.

11. The electrical connector of claim 10, further comprising first and second crimp connectors coupled to the first and second power cables, respectively, and wherein the first and second crimp connectors are configured for securing to the spade portions of the first and second outwardly extending portions, respectively.

12. An electrical connector, comprising:
a yoke, which is comprised of an outer housing and a central conductor provided within the outer housing, wherein the central conductor comprises at least three outwardly extending portions;
a first outwardly extending portion and a second outwardly extending portion of the central conductor which are operatively coupled to first and second power cables, respectively;
a third outwardly extending portion of the central conductor comprised of a sacrificial appendage configured to be cut through in order to confirm that the electrical connector is de-energized;
wherein the sacrificial appendage is comprised of a sacrificial cap, and wherein the yoke is configured to releasably retain the sacrificial cap in conductive contact with the third outwardly extending portion;
wherein the cut-through sacrificial cap of the sacrificial appendage can be removed and replaced by a ground rod which is releasably retained within the third outwardly extending portion of the central conductor and allows for the electrical connector to be grounded when a grounding device that is connected to system ground is attached to the ground rod; and
wherein the ground rod can be removed and replaced with a new, intact sacrificial cap which is releasably retained within the third outwardly extending portion of the central conductor and which is mechanically and conductively connected to the central conductor of the electrical connector.

13. The electrical connector of claim 12, wherein the yoke comprises a two-way yoke, a three-way yoke, or a four-way yoke.

14. The electrical connector of claim 12, wherein each of the first outwardly extending portion and the second outwardly extending portion further comprise a spade portion for connecting to the first and second power cables, respectively.

15. The electrical connector of claim 14, further comprising first and second crimp connectors coupled to the first and second power cables, respectively, and wherein the first and second crimp connectors are configured for securing to the spade portions of the first and second outwardly extending portions, respectively.

16. The electrical connector of claim 12, further comprising a first cable receptacle for providing an interface between the first outwardly extending portion and the first power cable, and a second cable receptacle for providing an interface between the second outwardly extending portion and the second power cable, wherein the first and second cable receptacles are configured for engagement with the outer housing of the yoke.

17. The electrical connector of claim 12, wherein the ground rod further comprises a rounded ball end on an outwardly extending portion of the ground rod which extends from the outer housing of the yoke for attachment to a ball type grounding clamp.

18. The electrical connector of claim 12, wherein the grounding device used for attachment to the ground rod is a bar type grounding clamp which connects to a middle elongate portion of the ground rod.

19. The electrical connector of claim 12, wherein the third outwardly extending portion further comprises a sacrificial interface conductively coupled to the third outwardly extending portion, and wherein the sacrificial interface is configured to releasably receive the sacrificial cap thereon.

20. The electrical connector of claim 19, wherein the sacrificial cap further comprises an insulative inner housing and a sacrificial conductor extending axially within the housing, and wherein the housing includes a cut-through region overlying the sacrificial conductor, and wherein the sacrificial conductor, and the sacrificial cap within which it is housed, is configured for releasable attachment to the sacrificial interface.

* * * * *